Dec. 20, 1960 H. EDLER 2,965,418

BEARING ASSEMBLY

Filed July 22, 1955

WITNESSES
Robert C. Baird
David M. Schiller

INVENTOR
Hans Edler.
BY C. L. Freedman
ATTORNEY

United States Patent Office
2,965,418
Patented Dec. 20, 1960

2,965,418

BEARING ASSEMBLY

Hans Edler, Neuhaus, near Hochstadt (Aisch), Germany, assignor to Siemens-Schuckertwerke Aktiengesellschaft, Erlangen, Germany, a corporation of Germany Filed July 22, 1955, Ser. No. 523,872

Claims priority, application Germany Aug. 7, 1954

4 Claims. (Cl. 308—15)

This invention relates to bearing assemblies and has particular relation to bearing assemblies which include bearings formed of synthetic resin materials.

Bearing members have previously been constructed in a variety of forms. As an example, bearing members have been formed of metallic materials such as brass. In recent years it has been the practice to construct bearing members of synthetic resin materials. The latter type of bearing exhibits a number of properties which are superior to those of bearing members formed of metallic materials.

For both types of bearing members it has previously been the practice to perform machining operations subsequent to the formation of the bearing member for the purpose of providing exact dimensions and a smooth contour of the bearing surface. Such operations have involved considerable time and expense. This is especially true in situations where the bearing members are constructed of small size for employment in delicate mechanical movements.

According to the present invention a bearing member is provided which includes a bearing body having a coating or film of a synthetic resin material for providing a bearing surface. The material of the coating or film may be different from the material employed in the bearing body. Preferably, however, the same material is employed for both the bearing body and the associated coating or film.

The coating for the bearing body may be formed in any suitable manner. According to a preferred embodiment of the invention, the bearing body and the coating are formed simultaneously by molding a suitable heat-meltable fluid resin material to provide a bearing member of the desired configuration. Excellent results have been obtained by utilizing a polyurethane resin material. However, a number of other resin materials may also be employed satisfactorily.

It has been observed that by selecting a mold having substantial heat conducting characteristics in the vicinity of the portion of the resin material which forms the bearing surface, the bearing surface exhibits excellent frictional properties and is of a very smooth contour. The bearing surface so formed is observed to be self-lubricating, thereby eliminating the necessity of applying expensive lubricants thereto. Furthermore, machining operations need not be performed on such a bearing surface.

Certain resin materials such as polyurethane exhibit a substantial coefficient of heat expansion. For this reason, it is undesirable to support a bearing member formed of such material in a manner which impedes expansion of the bearing member in response to temperature variations. A bearing member which is supported in this manner may become deformed when subjected to cycles of heating and cooling, thereby affecting the normal operation of the bearing member.

According to a further aspect of the invention, a bearing assembly is provided which includes a bearing member with support means supporting the bearing member in an operative position so as to permit unobstructed expansion of the bearing member in response to variations in temperature. In a preferred embodiment of the invention, a bearing member is provided having a main body with a cavity of the body extending parallel to the lateral surface of the body. It has been observed that for a bearing of such construction temperature variations effect expansion of the bearing member in directions transverse to the lateral surface of the main body.

In order to permit unobstructed expansion of the bearing member, the invention provides support means including a supporting base having securing means projecting therefrom which engage the bearing member at points spaced from the lateral surface of the body of the bearing member. The invention further provides support means including a member of resilient construction which is positioned to engage the lateral surface of the bearing body to permit unobstructed expansion of the bearing member.

In order to permit extension of the associated shaft through the cavity of the bearing member the invention further provides support means arranged to support the bearing member such that the cavity is unobstructed throughout the length of the bearing member. In order to assure an adequate supporting action the base member may include securing means of resilient construction which engage spaced points of the lateral surface of the bearing member.

It is therefore an object of the invention to provide an improved bearing member.

It is another object of the invention to provide an improved method of forming a bearing member.

It is a further object of the invention to provide a bearing assembly including a bearing member with improved means for supporting the bearing member in an operative position.

It is still another object of the invention to provide a bearing assembly including a bearing member which is subject to expansion in response to temperature variations with means for supporting the bearing member in a manner permitting unobstructed expansion thereof in response to temperature variations.

It is a still further object of the invention to provide a bearing member including a bearing body having a coating or film of a synthetic resin material providing a bearing surface which exhibits the improved bearing properties.

It is another object of the invention to provide a bearing assembly including a bearing member having a cavity providing a bearing surface with means supporting the bearing member in an operative position with the cavity unobstructed by the supporting means throughout the length of the bearing member such that expansion of the bearing member in a direction transverse to the cavity is unimpeded.

Other objects will become apparent from the following description taken in conjunction with the accompanying drawing, in which.

Figure 1:
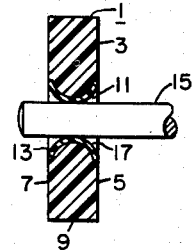
Figure 1 is a view in section of a bearing member constructed in accordance with the invention.

Referring to the drawing there is illustrated in Fig. 1 a bearing member represented generally by the numeral 1 constructed in accordance with the teachings of the invention. As shown in Fig. 1, the bearing member 1 is in the form of a cylinder having a main body 3 with a pair of opposed parallel end surfaces 5 and 7 connected by a transverse lateral surface 9. The body 3 is provided with a cavity 11 which extends therethrough between the surfaces 5 and 7 parallel to the lateral surface 9. The cavity 11 has a side wall 13 which provides a bearing surface for cooperation with a suitable rotatable member illustrated in the form of a cylindrical shaft 15. It is observed that the side wall 13 is of curved configuration for the purpose of providing a minimum area of engagement between the side wall and the cooperating shaft 15.

Bearing members have previously been constructed in a variety of forms. For example, bearing members formed of metallic materials have previously been employed. As a further example, it has recently been the practice to construct bearing members of synthetic resin materials. It has been observed that bearing members constructed of resin materials possess certain properties which are superior to those of the metallic bearings. For both types of bearing members, it has been found necessary to perform machining operations upon the bearing member subsequent to the formation thereof for the purpose of providing exact dimensions of the bearing surface and at the same time to provide a smooth contour of the bearing surface. Such machining operations are difficult and time consuming especially in situations involving bearing members of small construction for use in delicate mechanical movements.

According to the present invention, a bearing member is provided which includes a main body having a coating or film formed of a synthetic resin material for providing a bearing surface exhibiting improved bearing properties. As illustrated in Fig. 1, the main body 3 of the bearing member 1 has a film or coating 17 at the side wall 13 of the cavity 11 to form a bearing surface. Any suitable materials may be employed for the main body 3 and the coating 17. If desired, the body 3 and the coating 17 may be formed of different materials. According to a preferred embodiment of the invention, the body 3 and the coating 17 are formed of the same materials simultaneously by a molding operation. Preferably, a heat-meltable synthetic resin material such as a polyurethane resin material is employed for the body 3 and the coating 17.

Polyurethane suitable for bearing members constructed in accordance with the invention may be obtained by a number of reactions. For example, polyurethanes suitable for use in the present invention are produced by reacting a polyisocyanate, and particularly a diisocyanate, with a polyhydric alcohol, with a glycol or with an alkyd resin having unreacted hydroxyl groups as may be derived by reacting a molar excess of polyhydric alcohol with a polybasic acid or an anhydride.

Examples of suitable polyisocyanates the 1,6-hexamethylene diisocyanate, 2,4-toluene diisocyanate and triphenylmethane, p,p,p-triisocyanate. Suitable glycols are glycerol, ethylene glycol, 1,4-butanediol, and hexametriol. Alkyd resins may be prepared by reacting a saturated or unsaturated polycarboxylic acid or a mixture of two or more, such as adipic acid, succinic acid, phthalic anhydride, aconitic acid, maleic anhydride and fumaric acid with a molar excess of a polyhydric alcohol.

A suitable moldable solid polyurethane may be prepared by reacting at 180° C. for seven hours three moles of adipic acid, two moles of 1,3-butanediol, and two moles of trimethylolpropane to produce a hydroxy alkyd resin, and then reacting for one hour at 125° C. with one mole of toluene diisocyanate. The resulting resin may then be molded into bearings of the desired shape by heating within the range of 150° C. to 200° C.

It has been observed that bearing members formed of polyurethanes possess very desirable properties as compared to bearing members formed of metallic materials. For example, polyurethane bearings possess superior frictional and wearing properties as compared to conventional metallic bearings. Furthermore, bearings formed of a polyurethane are lighter in weight, are of a more resilient nature and are more resistant to corrosion than metallic bearings. In addition, polyurethane bearings provide good insulation against vibration and sound which renders their use in electrical instruments very desirable.

If desired, the polyurethanes employed in the formation of bearing members in accordance with the teachings of the invention may be mixed with a large variety of modifying agents, such as fillers and reenforcing agents. For example, solid lubricants, such as graphite, powdered mica or asbestos may be incorporated to provide desirable frictional properties of the bearing member.

Figure 2:
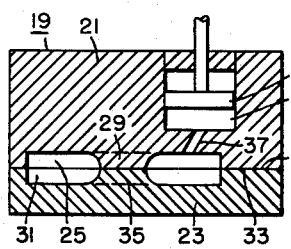
Fig. 2 is a view in section of a mold assembly suitable for use in the construction of the bearing member of Fig. 1.

Referring to Fig. 2, there is illustrated a mold assembly represented generally by the numeral 19 which is suitable for use in the formation of the bearing member 1. As shown in Fig. 2, the mold assembly 19 is of two-part construction including mold parts 21 and 23. The mold part 21 has an annular opening 25 in a surface 27 thereof surrounding a portion 29 of the mold part 21. In a similar manner the mold part 23 includes an annular opening 31 in a surface 33 thereof surrounding a portion 35 of the mold part 23.

It is observed that the openings 25 and 31 and the portions 29 and 35 are so configured as to provide a composite mold cavity having the configuration of the bearing member 1 when the mold parts 21 and 23 are positioned as shown in Fig. 2 with the surfaces 27 and 33 in engagement. With such arrangement the portions 29 and 35 provide the bearing surface of the bearing member 1.

It is observed that with the mold parts 21 and 23 positioned as shown in Fig. 2, the openings 25 and 31 of the mold parts communicate with one another. In order to permit introduction of the molding material into the composite cavity formed by the openings 25 and 31, the mold part 21 is provided with a cavity 36 which is connected to the opening 25 through a restricted connecting passage 37. A suitable plunger 39 is mounted for reciprocation relative to the mold part 21 in the cavity 36.

In order to form the bearing member 1, the following steps are performed. A solid heat-meltable resin material such as polyurethane is subjected to heat sufficient to provide a fluid condition of the material. The fluid material is then introduced into the cavity 36 in any suitable manner. The material is then forced into the communicating openings 25 and 31 from the cavity 36 through the passage 37 by actuation of the plunger 39 to entirely fill the composite cavity. The fluid material is then allowed to harden to a solid state. Preferably, the material is permitted to harden to a point at which the completed bearing member possesses a certain amount of resiliency, but at which a permanent material transformation is not possible. At this point the hardened material may be removed by separating the previously closed mold parts 21 and 23.

According to a preferred embodiment of the invention the mold assembly 19 is operated at a temperature which is considerably less than the temperature of the fluid material when the material is introduced into the assembly 19. Preferably, the assembly 19 is maintained at an ambient temperature with no heat other than that of the fluid material applied to the assembly 19.

It is observed that a bearing member constructed in the manner described has a bearing surface which is self-lubricating and which is of extremely smooth contour. It is believed that the bearing surface constitutes a film or coating which is formed during the molding operation at the area where the fluid material contacts the portions 29 and 35 of the mold parts. It is thought that the sudden removal of heat from the fluid material contacting the portions 29 and 35 effects an alteration of the molecular structure of such material in a manner which provides extremely desirable bearing properties of the molded bearing member. By providing a mold assembly 19 which is constructed of a metallic material, the dissipation of heat from the fluid material in contact with the portions 29 and 35 is effective to provide extremely desirable frictional properties of the bearing surface so formed.

It has been observed that bearing members constructed of certain synthetic resin materials such as polyurethane exhibit substantial coefficients of heat expansion. In order to prevent deformation of a bearing member formed of such materials in response to temperature variations, the invention provides a bearing assembly including supporting means for supporting the bearing member in an operative position to permit unobstructed expansion of the bearing member in response to temperature variations.

Figure 3:
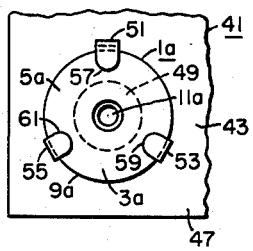
Fig. 3 is a view in top plan of a bearing assembly illustrating support means constructed in accordance with the invention.
Figure 4:
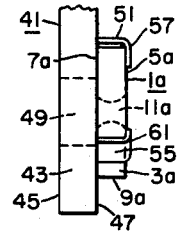
Fig. 4 is a view in side elevation of the assembly of Fig. 3.

Referring to Figs. 3 and 4, a bearing member 1a is illustrated which is similar to the bearing member 1 of Fig. 1. The bearing member 1a includes a main body 3a having opposed parallel end surfaces 5a and 7a connected by a lateral surface 9a.

The body 3a includes a cavity 11a extending between the surfaces 5a and 7a in a direction parallel to the lateral surface 9a.

It has been observed that expansion of the bearing member 1a in response to temperature variations is in directions transverse to the lateral surface 9a. For the purpose of supporting the bearing member 1a in an operative positon to permit unobstructed expansion thereof in such transverse direction, support means represented generally by the numeral 41 is provided. The support means 41 is further arranged to mount the bearing member 1a such that the cavity 11a is unobstructed by the support means throughout the length of the bearing member.

As illustrated in Figs. 3 and 4, the support means 41 includes a base member 43 having opposed parallel surfaces 45 and 47 with an opening 49 extending between the parallel surfaces. The opening 49 is provided with a diameter which is greater than the diameter of the cavity 11a of the bearing member 1a. The base member 43 further includes a plurality of extensions 51, 53 and 55 having respectively hooked end portions 57, 59 and 61. The extensions are shown as being spaced equally about the axis of the opening 49 of the base member 43. However, the extensions 53 and 55 are spaced equal distances in a radial direction from such axis whereas the extension 51 is spaced a greater distance radially from such axis than the extensions 53 and 55.

As illustrated in Fig. 4, the base member 43 is positioned with respect to the bearing member 1a with the surface 47 in engagement with the surface 7a to have the opening 49 substantially in alignment with the cavity 11a. It is observed that with this arrangement the cavity 11a is unobstructed by the base member 43 throughout the length of the bearing member 1a to thereby permit extension of an associated shaft through the cavity 11a. The extensions 51, 53 and 55 are proportioned and positioned to firmly support the bearing member 1a in engagement with the base member 43 so as to permit expansion of the bearing member 1a in a direction transverse to the radial surface 9a.

For this purpose, the extension 51 is positioned with the end portions 57 thereof in engagement with the surface 5a of the bearing member 1a at a point directly above the cavity 11a as viewed in Fig. 3 to bias the bearing member 1a into engagement with the base member 43. To this end the extension 51 is preferably formed of a resilient material. In order to firmly secure the bearing member 1a to the base member 43, the extensions 53 and 55 are positioned to engage the lateral surface 9a with the end portions 59 and 61 in engagement with the surface 5a at spaced points beneath the cavity 11a as viewed in Fig. 3. The extensions 53 and 55 are preferably of resilient construction so as to bias the bearing member into engagement with the base member. Unimpeded expansion of the bearing member in a direction transverse to the lateral surface 9a is permitted by reason of the extension 51 which is spaced from the lateral surface 9a as clearly shown in Fig. 4, and by means of the resilient construction of the extensions 53 and 55.

Figure 5:
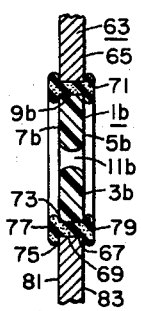
Fig. 5 is a view in section of a bearing assembly illustrating a further embodiment of the invention.

Referring to Fig. 5 there is illustrated a bearing assembly of different construction than the assembly of Figs. 3 and 4. As shown in Fig. 5, a bearing member 1b is provided which is similar to the bearing member 1 of Fig. 1. The bearing member 1b includes a body 3b having end surfaces 5b and 7b connected by a lateral surface 9b. A cavity 11b is formed in the body 3b to provide a bearing surface.

In the embodiment of Fig. 5, support means represented generally by the numeral 63 is provided which includes resilient means engaging the bearing member 1b to permit expansion thereof in response to temperature variations. The support means 63 is further arranged to mount the bearing member 1b with the cavity 11b unobstructed by the support means throughout the length of the bearing member.

As shown in Fig. 5 the support means 63 includes a base member 65 having an opening 67 with a diameter greater than the diameter of the bearing member 1b. The opening 67 is proportioned to receive the bearing member 1b with clearance between the lateral surface 9b of the bearing member and the side wall 69 of the opening 67. In order to mount the bearing member 1b relative to the base member 65 to permit expansion of the bearing member in response to temperature variations a resilient member 71 is positioned to surround the lateral surface 9b of the bearing member in the space between the side wall 69 and the lateral surface 9b to engage the bearing member and the base member.

The resilient member 71 is shown in the form of a ring having a pair of opposed annular channels 73 and 75 for receiving respectively the bearing member 1b and the base member 65. The channels 73 and 75 define a pair of spaced flanges 77 and 79 which engage respectively the surface 7b of the bearing member and a surface 81 of the base member, and the opposing surface 5b of the bearing member and an opposing surface 83 of the base member. Such arrangement assures a positive securing action with the cavity 11b unobstructed throughout the length of the bearing member in addition to permitting expansion of the bearing member in directions transverse to the surface 9b in response to temperature variations.

Figure 6:
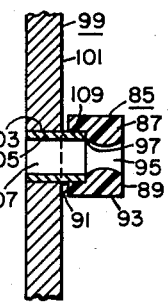
Fig. 6 is a view in section of a bearing assembly illustrating an additional embodiment of the invention.

Referring to Fig. 6, there is illustrated a bearing assembly of different construction than the assemblies of Figs. 3 through 5, inclusive. As shown in Fig. 6, a bearing member 85 is provided having a main body 87 with a pair of opposed end surfaces 89 and 91 connected by a lateral surface 93. The body 87 includes a cavity 95 which extends from the surface 89 in a direction parallel to the lateral surface 93. An additional cavity 97 is formed in the body 87 which extends from the surface 91 to communicate with the cavity 95. It is observed that the cavity 97 has a greater diameter than the cavity 95.

In order to support the bearing member 85 in an operative position, suitable support means represented generally by the numeral 99 is provided. The support means 99 includes a base member 101 which is provided with an opening 103 extending between opposed surfaces of the base member. The diameter of the opening 103 is selected to be substantially equal to the diameter of the cavity 97 and greater than the diameter of the cavity 95 of the bearing member 85.

For the purpose of securing the bearing member 85 to the base member 101 to permit expansion of the bearing member 85 in a direction transverse to the lateral surface 93, a suitable securing member 105 is provided. The member 105 is in the form of a hollow tube having an opening 107 extending therethrough. The diameter of the opening 107 is selected to be slightly greater than the diameter of the cavity 95 of the bearing member whereas the diameter of the tube 105 is selected to be slightly greater than the diameters of the opening 103 and the cavity 97.

In order to secure the bearing member 85 to the base member 101, the base member is positioned in spaced relation with respect to the bearing member to have the opening 103 substantially in alignment with the cavities 95 and 97 of the bearing member. The member 105 is positioned within the opening 103 in a press fit condition with an end portion 109 of the member 105 projecting beyond the base member 101 to engage the cavity 97 of the bearing member in a press fit condition. With such arrangement, the cavity 95 of the bearing member is unobstructed by the support means 99 throughout the length of the bearing member 85 thereby permitting the extension of an associated shaft through the cavity 95. This arrangement further permits the unobstructed expansion of the bearing member in a direction transverse to the lateral surface 93 in response to temperature variations.

Figure 7:
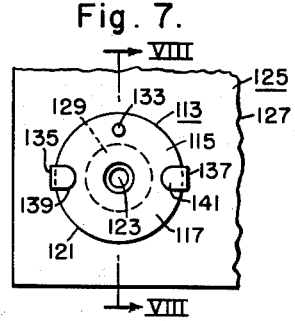
Fig. 7 is a view in top plan of a bearing assembly illustrating still another embodiment of the invention.
Figure 8:
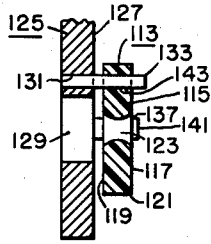
Fig. 8 is a view taken along the line VIII—VIII of Fig. 7.

In Figs. 7 and 8 there is illustrated a bearing assembly of different construction than the assemblies shown in Figs. 3 through 6, inclusive. The assembly of Figs. 7 and 8 includes a bearing member 113 having a body 115 with opposed parallel end surfaces 117 and 119 connected by a lateral surface 121. A cavity 123 is formed in the body 115 to extend between the surfaces 117 and 119 in a direction parallel to the lateral surface 121.

In order to support the bearing member 113 in an operative position to permit expansion of the bearing member in a direction transverse to the lateral surface 121, support means represented generally by the numeral 125 is provided. The support means 125 includes a base member 127 having an opening 129 extending therethrough of a diameter greater than the diameter of the cavity 123. The base member 127 further includes an opening 131 which is spaced from the opening 129 to extend substantially parallel thereto. As best shown in Fig. 7, the base member 127 further includes a pair of extensions 135 and 137 which project from a common surface of the base member at diametrically spaced points relative to the opening 129. The extensions 135 and 137 include respectively hooked end portions 139 and 141 which project toward each other.

The base member 127 is positioned in spaced relation with respect to the bearing member 113 with the opening 129 substantially in alignment with the cavity 123 of the bearing member, and with the opening 131 of the base member substantially in alignment with an opening 143 of the bearing member which is spaced from the cavity 123 to extend substantially parallel thereto. The diameter of the opening 143 is selected to be substantially equal to the diameter of the opening 131. In order to secure the bearing member to the base member, a suitable pin 133 is provided which is positioned within the aligned openings 131 and 143 in a press fit condition. The extensions 135 and 137 are proportioned to engage the lateral surface 121 of the bearing member with the end portions 139 and 141 thereof in engagement with the surface 117 at diametrically spaced points to prevent movement of the bearing member relative to the base member about the axis of the pin 133. The extensions 135 and 137 are preferably formed of a resilient material to permit biased engagement of the end portions 139 and 141 with the surface 117, and to permit expansion of the bearing member.

The support means 125 is effective to secure the bearing member 113 in an operative position such that the cavity 123 of the bearing member is unobstructed throughout the length of the bearing member. Furthermore, the bearing member is mounted such that expansion thereof in directions transverse to the lateral surface 121 is unobstructed.

Although the invention has been described with reference to certain specific embodiments thereof, numerous modifications falling within the spirit and scope of the invention are possible.

I claim as my invention:

1. In a bearing assembly for mounting a shaft for rotation about the shaft axis, a bearing member formed of a synthetic resin material having a lateral surface, said bearing member having a cavity extending therethrough in a direction substantially parallel to said lateral surface, said cavity having a side wall providing a bearing surface, said bearing member being expansible in a direction transverse to said lateral surface in response to variations in temperature, and support means for supporting said bearing member in an operative position, said support means including a base member spaced from said bearing member and securing means mounted by the base member and extending into said cavity in engagement with said side walls to support said bearing member for free expansion of the bearing member in said transverse direction, said bearing surface having a diameter with a dimension which is smaller than any other dimension parallel thereto between spaced parts in said cavity throughout the length of the bearing member.

2. In a bearing assembly for mounting a shaft for rotation about the shaft axis, a bearing member formed of a synthetic resin material having a cavity extending therethrough, said cavity including a first cavity portion having a side wall curved to form a non-uniform diameter providing a substantially frictionless bearing surface at the area of the minimum diameter, and an enlarged second cavity portion communicating with said first cavity portion, said bearing member being expansible in a direction transverse to the direction of extension of said cavity in response to variations in temperature, and support means for supporting said bearing member in an operative position, said support means including a base member having an opening with a diameter greater than the minimum diameter of said curved side wall, said base member being positioned with said opening in alignment with said cavity, and a supporting member having an opening extending therethrough with a diameter greater than the minimum diameter of said curved side wall, said supporting member being positioned within said base member opening mounted by said base member to extend into said second cavity portion, said supporting member engaging the side wall of the second cavity portion to thereby mount the bearing member to permit unrestricted expansion thereof in said transverse direction.

3. In a journal bearing, a bearing member having an opening extending therethrough, said opening including first and second portions located on opposite sides of a plane, said first portion being defined by a surface of revolution having an axis transverse to said plane and having a minimum diameter less than the diameter of said second portion, and a bearing support having a part located within the second portion in engagement with the surface of the opening, said bearing member being substantially free to expand in all directions away from said axis, said part being spaced from the axis at all points by a distance greater than said minimum diameter.

4. In a bearing assembly for supporting the journal of a shaft, a bearing member formed of a synthetic resin material having spaced side walls and a peripheral wall connecting said side walls, said material having a coefficient of expansion such that upon changes of temperature said material materially changes in dimension, said bearing member having an aperture of circular cross section centrally located with respect to said peripheral wall, said aperture opening outwardly through said side walls, and support means for supporting said bearing member in an operative position, said support means including a base member and securing means, said securing means being carried by said base member and supporting said bearing member on said base member such that movement of said peripheral wall portion of said bearing member relative to said base member in a direction transverse to said peripheral wall in response to changes in temperature of said bearing member is unrestrained by said supporting means.

References Cited in the file of this patent

UNITED STATES PATENTS

| | | |
|---|---|---|
| 1,963,940 | Duffy | June 19, 1934 |
| 2,424,883 | Habgood et al. | July 29, 1947 |
| 2,448,676 | MacMillin et al. | Sept. 7, 1948 |
| 2,532,779 | Parks | Dec. 5, 1950 |
| 2,542,263 | Schultz | Feb. 20, 1951 |
| 2,644,199 | Miller | July 7, 1953 |
| 2,654,641 | Veatch et al. | Oct. 6, 1953 |
| 2,656,130 | Inman | Oct. 20, 1953 |
| 2,681,257 | Niesemann | June 15, 1954 |
| 2,696,841 | Heim | Dec. 14, 1954 |
| 2,738,240 | Parsons | Mar. 13, 1956 |
| 2,746,815 | King | May 22, 1956 |
| 2,772,930 | Schubert | Dec. 4, 1956 |

FOREIGN PATENTS

| | | |
|---|---|---|
| 597,881 | Great Britain | Feb. 5, 1948 |